United States Patent
Yang et al.

(10) Patent No.: US 12,446,108 B2
(45) Date of Patent: Oct. 14, 2025

(54) METHOD FOR PUCCH TRANSMISSION, METHOD FOR PUCCH RECEPTION, TERMINAL, AND NETWORK-SIDE DEVICE

(71) Applicant: VIVO MOBILE COMMUNICATION CO., LTD., Guangdong (CN)

(72) Inventors: Yu Yang, Guangdong (CN); Peng Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 510 days.

(21) Appl. No.: 17/383,518

(22) Filed: Jul. 23, 2021

(65) Prior Publication Data
US 2021/0352500 A1   Nov. 11, 2021

Related U.S. Application Data

(63) Continuation of application No. PCT/CN2020/070899, filed on Jan. 8, 2020.

(30) Foreign Application Priority Data

Jan. 25, 2019   (CN) .......................... 201910075897.7

(51) Int. Cl.
*H04W 76/34*   (2018.01)
*H04B 7/06*   (2006.01)
(Continued)

(52) U.S. Cl.
CPC ........ *H04W 76/34* (2018.02); *H04B 7/06964* (2023.05); *H04B 7/06968* (2023.05);
(Continued)

(58) Field of Classification Search
CPC .. H04B 7/0404; H04B 7/0626; H04B 7/0695; H04B 7/0617; H04L 41/0668;
(Continued)

(56) References Cited

U.S. PATENT DOCUMENTS 11,363,516 B2 *   6/2022   Kyung ................. H04W 36/36
11,405,929 B2 *   8/2022   Tsai ..................... H04B 7/0632
(Continued)

FOREIGN PATENT DOCUMENTS

CN   108112074 A   6/2018
CN   108809580 A   11/2018
(Continued)

OTHER PUBLICATIONS

R1-1814069. MediaTek. 3GPP TSG RAN WG1 Meeting #95. "Summary on Beam Failure Recovery" Spokane. Nov. 12-16, 2018. (Year: 2018).*
(Continued)

*Primary Examiner* — Stephen J Clawson
(74) *Attorney, Agent, or Firm* — Price Heneveld LLP

(57) ABSTRACT

Embodiments of this disclosure provide a method for PUCCH transmission, a method for PUCCH reception, a terminal, and a network side device. The method for PUCCH transmission is applied to the terminal and includes: transmitting a first PUCCH of at least one cell by using determined spatial relation information after transmitting a beam failure recovery request message to a network side, where the at least one cell includes: a primary cell and at least one secondary cell, or at least one secondary cell.

13 Claims, 5 Drawing Sheets

Transmit a first PUCCH of at least one cell by using determined spatial relation information after transmitting a beam failure recovery request message to a network side, where the at least one cell includes: a primary cell and at least one secondary cell, or at least one secondary cell — 21

(51) Int. Cl.
    *H04L 5/00*     (2006.01)
    *H04L 41/0893*     (2022.01)
    *H04W 24/04*     (2009.01)
    *H04W 24/08*     (2009.01)
    *H04W 72/20*     (2023.01)
    *H04W 74/00*     (2009.01)

(52) U.S. Cl.
CPC .......... *H04L 5/0048* (2013.01); *H04L 5/0055* (2013.01); *H04L 41/0893* (2013.01); *H04W 24/04* (2013.01); *H04W 24/08* (2013.01); *H04W 72/20* (2023.01); *H04W 74/006* (2013.01)

(58) Field of Classification Search
CPC ............. H04L 41/0893; H04L 41/0654; H04L 5/0048; H04L 5/0055; H04L 1/1864; H04W 24/04; H04W 24/08; H04W 74/006; H04W 76/14; H04W 76/19; H04W 76/34; H04W 16/28; H04W 72/046; H04W 72/20; H04W 72/21
See application file for complete search history.

(56) References Cited

U.S. PATENT DOCUMENTS

| | | | |
|---|---|---|---|
| 2018/0302889 A1 | 10/2018 | Guo et al. | |
| 2018/0323856 A1 | 11/2018 | Xiong et al. | |
| 2018/0368124 A1 | 12/2018 | Liu et al. | |
| 2019/0253941 A1* | 8/2019 | Cirik | H04W 36/0077 |
| 2019/0394082 A1* | 12/2019 | Cirik | H04W 24/08 |
| 2020/0344835 A1* | 10/2020 | Wang | H04L 1/1896 |
| 2021/0111780 A1* | 4/2021 | Zhou | H04B 7/0495 |
| 2021/0160853 A1 | 5/2021 | Gao et al. | |
| 2021/0184749 A1* | 6/2021 | Chen | H04W 80/02 |
| 2021/0314051 A1* | 10/2021 | Yang | H04W 80/02 |
| 2023/0208498 A1* | 6/2023 | Zhu | H04L 5/0091 370/329 |

FOREIGN PATENT DOCUMENTS

| | | |
|---|---|---|
| CN | 108882327 A | 11/2018 |
| CN | 109076365 A | 12/2018 |
| IN | 109039408 A | 12/2018 |
| WO | 2018228191 A1 | 12/2018 |

OTHER PUBLICATIONS

Mediatek Inc., "Remaining Issues for Beam Management and Beam Failure Recovery", 3GPP TSG RAN WG1 Meeting #94, R1-1808264, Gothenburg, Sweden, Aug. 20-24, 2018.

Vivo, "Draft CR on beam management", 3GPP TSG RAN WG1 Meeting #95, R1-1812285, Spokane, USA, Nov. 12-16, 2018.

Convida Wireless, "On Beam Failure Recovery for SCell", 3GPP TSG-RAN WG1 Ad-Hoc Meeting 1901, R1-1901206, Taipei, Taiwan, Jan. 21-25, 2019.

Cheng, et al., "Design and Implementation of beam failure recovery in 5G," Network Technology and Planning Department, China Telecom Beijing Reserach Institute, Beijin 102209, China, 2018 (4 pages).

3rd Generation Partnership Project; Technical Specification Group Radio Access Network; NR; Physical layer procedures for control (Release 15) 3GPP TS 38.213 v15.3.0 (Sep. 2018) (101 pages).

Mediatek, Inc., "Summary on Beam Failure Recovery," 3GPP TSG RAN WG1 Meeting #95 R1-1814069, Spokane US, Nov. 12-16, 2018 (35 pages).

Intel Corporation, "Summary on SCell BFR and Beam Measurement," 3GPP TSG RAN WG1 Meeting #94b R1-1811853, Chengdu, China, Oct. 8-12, 2018 (15 pages).

Motorola Mobility, "On non-CA NR UL power control", 3GPP TSG RAN WG1 #92, R1-1802678, Athens, Greece, Feb. 26-Mar. 2, 2018.

Qualcomm Incorporated, "Beam management for NR", 3GPP TSG-RAN WG 1 Meeting #95, RI-1813876, Spokane, US, Nov. 12-16, 2018.

* cited by examiner

Transmit a first PUCCH of at least one cell by using determined spatial relation information after transmitting a beam failure recovery request message to a network side, where the at least one cell includes: a primary cell and at least one secondary cell, or at least one secondary cell ⸺ 21

Receive a first PUCCH of at least one cell by using determined spatial relation information after receiving a beam failure recovery request message transmitted by a terminal, where the at least one cell includes: a primary cell and at least one secondary cell, or at least one secondary cell ⸺ 31

FIG. 3

Skip transmitting a first PUCCH of at least one cell after transmitting a beam failure recovery request message to a network side, where the at least one cell includes: a primary cell and at least one secondary cell, or at least one secondary cell ⸺ 41

FIG. 4

Skip receiving a first PUCCH of at least one cell after receiving a beam failure recovery request message transmitted by a terminal, where the at least one cell includes: a primary cell and at least one secondary cell, or at least one secondary cell ⸺ 51

FIG. 5

METHOD FOR PUCCH TRANSMISSION, METHOD FOR PUCCH RECEPTION, TERMINAL, AND NETWORK-SIDE DEVICE

CROSS-REFERENCE TO RELATED APPLICATIONS

This application is a continuation application of International Application No. PCT/CN2020/070899 filed on Jan. 8, 2020, which claims priority to Chinese Patent Application No. 201910075897.7, filed in China on Jan. 25, 2019, both disclosures of which are incorporated herein by reference in their entireties.

TECHNICAL FIELD

Embodiments of this disclosure relate to the field of communications technologies, and in particular, to a method for PUCCH transmission, a method for PUCCH reception, a terminal, and a network-side device.

BACKGROUND

In research of next-generation communication systems beyond 4G, an operating band supported by the system is increased to above 6 GHz, even up to about 100 GHz. Relatively abundant idle frequency resources are available in high bands, to provide greater throughput for data transmission. At present, 3GPP carries out research and standardization work on middle and high bands in new radio (NR). High-frequency signals feature short wavelengths, and compared with low bands, for high bands, more antenna array elements can be arranged on an antenna panel of a same size, and beams with greater directivity and narrower lobes are formed by using a beamforming technology. Therefore, combination of massive antennas and high-frequency communication has also become one of the future trends.

In a high-frequency communications system, due to relatively short wavelengths of radio signals, the signals are more likely to be blocked during propagation, resulting in interruption of signal propagation. Radio link reestablishment in the related art is relatively time-consuming. Therefore, a beam failure recovery mechanism is introduced.

For a multi-carrier scenario (which may be understood as carrier aggregation (CA), where there are multiple carriers or multiple component carriers (CC) or multiple cells), there is one primary cell (for example, a primary cell (PCell) in a master cell group (MCG), or a primary secondary cell (PSCell) in a secondary cell group (SCG)) and at least one secondary cell Scell (secondary cell).

Research on the beam failure recovery mechanism in the multi-carrier scenario has been just started in the related art. A problem that needs to be confronted is how to determine beam information of a physical uplink control channel (PUCCH) in one or more cells in a case that a beam failure event occurs in the cells and a beam failure recovery procedure is performed.

SUMMARY

According to a first aspect, an embodiment of this disclosure provides a method for PUCCH transmission, applied to a terminal and including:

transmitting a first PUCCH of at least one cell by using determined spatial relation information after transmitting a beam failure recovery request message to a network side, where the at least one cell includes: a primary cell and at least one secondary cell, or at least one secondary cell.

According to a second aspect, an embodiment of this disclosure provides a method for PUCCH reception, applied to a network-side device and including:

receiving a first PUCCH of at least one cell by using determined spatial relation information after receiving a beam failure recovery request message transmitted by a terminal, where the at least one cell includes: a primary cell and at least one secondary cell, or at least one secondary cell.

According to a third aspect, an embodiment of this disclosure provides a terminal, including:

a processing module, configured to transmit a first PUCCH of at least one cell by using determined spatial relation information after transmitting a beam failure recovery request message to a network side, where the at least one cell includes: a primary cell and at least one secondary cell, or at least one secondary cell.

According to a fourth aspect, an embodiment of this disclosure provides a network-side device, including:

a processing module, configured to receive a first PUCCH of at least one cell by using determined spatial relation information after receiving a beam failure recovery request message transmitted by a terminal, where the at least one cell includes: a primary cell and at least one secondary cell, or at least one secondary cell.

According to a fifth aspect, an embodiment of this disclosure provides a terminal, including a processor, a memory, and a computer program stored in the memory and capable of running on the processor. When the computer program is executed by the processor, the steps of the foregoing method for PUCCH transmission are implemented.

According to a sixth aspect, an embodiment of this disclosure provides a network-side device, including a processor, a memory, and a computer program stored in the memory and capable of running on the processor. When the computer program is executed by the processor, the steps of the foregoing method for PUCCH reception are implemented.

According to a seventh aspect, some embodiments of this disclosure provide a computer-readable storage medium, where a computer program is stored in the computer-readable storage medium. When the computer program is executed by a processor, the steps of the foregoing method for PUCCH transmission are implemented, or when the computer program is executed by the processor, the steps of the foregoing method for PUCCH reception are implemented.

BRIEF DESCRIPTION OF DRAWINGS

Other advantages and benefits will become apparent to those of ordinary skill in the art by reading the following detailed descriptions of optional implementations. The accompanying drawings are merely intended to illustrate the purposes of the optional implementations, and should not be construed as a limitation on this disclosure. Throughout the accompanying drawings, the same reference numerals represent the same components. In the accompanying drawings:

FIG. 3 is a schematic flowchart of a method for PUCCH reception according to an embodiment of this disclosure;

FIG. 4 is a schematic flowchart of a method for PUCCH transmission according to another embodiment of this disclosure;

FIG. 5 is a schematic flowchart of a method for PUCCH reception according to another embodiment of this disclosure;

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

In the specification and claims of this application, the term "include" and any other variants thereof are intended to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device. In addition, in the specification and claims, the use of "and/or" represents presence of at least one of the connected objects, for example, "A and/or B" indicates the following three cases: A alone, B alone, or both A and B.

In the embodiments of this disclosure, the terms "an example" or "for example" are used to represent an example, an illustration, or a description. Any embodiment or design solution described as "an example" or "for example" in the embodiments of this disclosure should not be construed as preferred or advantageous over other embodiments or design solutions. To be precise, the use of terms such as "an example" or "for example" is intended to present a related concept in a specific manner.

The following describes the embodiments of this disclosure with reference to the accompanying drawings. A method for PUCCH transmission, a method for PUCCH reception, a terminal, and a network-side device provided in the embodiments of this disclosure may be applied to a wireless communications system. The wireless communications system may be a 5G system, or an evolved long term evolution (eLTE) system, or a later evolved communications system.

Figures 1, 2:
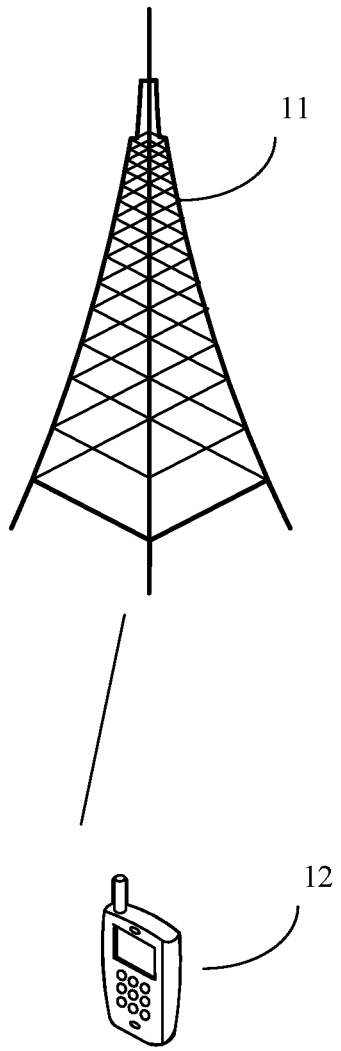
FIG. 1 is a schematic architectural diagram of a wireless communications system according to an embodiment of this disclosure.
FIG. 2 is a schematic flowchart of a method for PUCCH transmission according to an embodiment of this disclosure.

Referring to FIG. 1, FIG. 1 is a schematic architectural diagram of a wireless communications system according to an embodiment of this disclosure. As shown in FIG. 1, the wireless communications system may include: a network-side device 11 and a terminal 12, and the terminal 12 may be connected to the network-side device 11. In an actual application, connection between the foregoing devices may be wireless connection. To conveniently and visually represent a connection relationship between the devices, a solid line is used in FIG. 1.

It should be noted that the communications system may include a plurality of terminals 12, and the network-side device 11 may communicate (transmit signaling or transmit data) with a plurality of terminals 12.

The network-side device 11 provided in this embodiment of this disclosure may be a base station. The base station may be a commonly used base station, or may be an evolved node base station (eNB), or may be a device such as a network-side device (for example, a next generation base station (gNB)), a transmission and reception point (TRP), or a cell in a 5G system, or a network-side device in a later evolved communications system. However, the terms used do not constitute any limitation.

The terminal 12 provided in this embodiment of this disclosure may be a mobile phone, a tablet computer, a notebook computer, an ultra-mobile personal computer (UMPC), a netbook, a personal digital assistant (PDA), or the like. Those skilled in the art can understand that the terms used do not constitute any limitation.

Spatial relation information mentioned in the following embodiments may also be referred to as beam information, spatial domain transmission filter information, spatial filter information, or quasi co-location (QCL) information.

Referring to FIG. 2, FIG. 2 is a schematic flowchart of a method for PUCCH transmission according to an embodiment of this disclosure. The method for PUCCH transmission is applied to a terminal and includes the following step.

Step 21: Transmit a first PUCCH of at least one cell by using determined spatial relation information after transmitting a beam failure recovery request message to a network side, where the at least one cell includes: a primary cell and at least one secondary cell, or at least one secondary cell.

The at least one cell may be a cell or a group of cells, including a cell with a beam failure event, that is, part or all of the at least one cell are cells with beam failure events. In this embodiment of this disclosure, before the terminal transmits the beam failure request message to the network side, the following step may be further included: the terminal performs beam failure detection in the at least one cell.

A beam failure detection process may be as follows: A terminal performs measurement on a beam failure detection reference signal (BFD RS) at a physical layer, and determines, based on a measurement result, whether a beam failure event occurs. A determining criterion is: if it is detected that a metric (hypothetical PDCCH BLER) of all serving beams satisfies a preset condition (exceeding a preset threshold), one beam failure instance (BFI) is determined, and the physical layer of the terminal reports an indication to a higher layer (MAC layer) of the terminal. The reporting process is periodical. A BFI reporting period is a shortest period of the BFD RS, with a lower limit being 2 ms. On the contrary, if the physical layer of the terminal device determines that no beam failure instance has occurred, no indication is transmitted to the higher layer. The higher layer of the terminal uses a counter and a timer to count beam failure instances reported by the physical layer, restarts the timer each time a beam failure instance is received, and restarts the counter when the timer expires. When the counter reaches a maximum quantity of times configured by a network, the terminal determines that a beam failure event occurs.

In this embodiment of this disclosure, optionally, the transmitting a first PUCCH of at least one cell by using determined spatial relation information includes:

if a first preset condition is satisfied, transmitting the first PUCCH of the at least one cell by using the determined spatial relation information.

In this embodiment of this disclosure, optionally, the first preset condition includes one of the following:

(1) Downlink information transmitted by the network side is received in a first preset cell.

The terminal considers that the downlink information is a response, to the beam failure recovery request message, from the network side.

(2) The beam failure recovery request message is transmitted to the network side for N times in a second preset cell, where N is a positive integer greater than or equal to 1.

(3) The beam failure recovery request message is transmitted to the network side for N times in the second preset cell, and downlink information transmitted by the network side has not been received in the first preset cell within first preset duration, where N is a positive integer greater than or equal to 1.

In this embodiment of this disclosure, optionally, the downlink information includes one of the following:

(1) A Physical Downlink Control Channel (PDCCH) on a CORESET-BFR (Control Resource Set for Beam Failure Recovery Request)

That is, the first preset condition is that a PDCCH transmitted by the network side is received on a CORESET-BFR of the first preset cell.

In this embodiment of this disclosure, optionally, the PDCCH is a PDCCH and corresponding to a DCI format whose cyclic redundancy check (CRC) is scrambled by a cell radio network temporary identifier (C-RNTI) or a modulation and coding scheme-cell radio network temporary identifier (MCS-C-RNTI) in a search space set, indicated by a high-layer parameter, of a control resource set for transmitting beam failure recovery request response information.

In this embodiment of this disclosure, optionally, higher-layer parameters corresponding to different cells may be different. C-RNTIs or MCS-C-RNTIs corresponding to different cells and used for scrambling the CRC may also be different.

(2) Downlink Control Information (DCI)

That is, the first preset condition is that DCI transmitted by the network side is received in the first preset cell.

In this embodiment of this disclosure, the DCI may be any DCI other than DCI of the foregoing PDCCH.

In some embodiments of this disclosure, optionally, the DCI includes one of the following:
  DCI used for indicating the terminal to re-perform beam training;
  DCI used for indicating the terminal to re-perform beam selection;
  DCI used for scheduling downlink channel transmission;
  DCI used for scheduling uplink channel transmission;
  DCI used for scheduling downlink reference signal transmission; or
  DCI used for scheduling uplink reference signal transmission.

(3) Random Access Response (RAR)

That is, the first preset condition is that a RAR transmitted by the network side is received in the first preset cell.

In this embodiment of this disclosure, optionally, if the downlink information includes the RAR, the transmitting, by the terminal, a beam failure recovery request message to a network side includes: transmitting, by the terminal, the beam failure recovery request message to the network side by using a contention-based physical random access channel (PRACH).

(4) Release Command (Also Referred to as a Deactivation Command) Used for Releasing a Cell in which a Beam Failure Occurs That is, the first preset condition is that a release command transmitted by the network side and used for releasing the cell with the beam failure is received in the first preset cell.

(5) Scheduling Information for a Cell with a Beam Failure

That is, the first preset condition is that scheduling information, transmitted by the network side, for a cell with a beam failure is received in the first preset cell.

(6) First Trigger Information for a Cell with a Beam Failure, where the First Trigger Information is Used to Trigger Beam Measurement and/or Beam Reporting That is, the first preset condition is that first trigger information, transmitted by the network side, for a cell with a beam failure is received in the first preset cell, where the first trigger information is used to trigger beam measurement and/or beam reporting.

(7) Second Trigger Information for Channel State Information (CSI) Measurement and/or CSI Reporting for a Cell with a Beam Failure That is, the first preset condition is that second trigger information, transmitted by the network side, for a cell with a beam failure is received in the first preset cell, where the second trigger information is used to trigger CSI measurement and/or CSI reporting.

(8) ACK Corresponding to Scheduling Information for a Cell with a Beam Failure

That is, the first preset condition is that an acknowledgement (ACK) corresponding to scheduling information, transmitted by the network side, for a cell with a beam failure is received in the first preset cell.

(9) Negative Acknowledgement (NACK) Corresponding to Scheduling Information for a Cell with a Beam Failure That is, the first preset condition is that a NACK corresponding to scheduling information, transmitted by the network side, for a cell with a beam failure is received in the first preset cell.

In this embodiment of this disclosure, optionally, the scheduling information, the first trigger information, or the second trigger information is used for cross-carrier scheduling.

In this embodiment of this disclosure, optionally, the transmitting, by the terminal, a beam failure recovery request message to a network side includes: transmitting, by the terminal, the beam failure recovery request message to the network side by using a physical random access channel (PRACH), a media access control control element (MAC CE), or a second PUCCH.

In this embodiment of this disclosure, optionally, the first preset cell used for receiving the downlink information is one of the following:
  a cell with a beam failure;
  a cell without a beam failure;
  a cell in the at least one cell;
  a cell not in the at least one cell; or
  a primary cell.

In this embodiment of this disclosure, optionally, the second preset cell used for transmitting the beam failure recovery request message is one of the following:
  a cell with a beam failure;
  a cell without a beam failure;
  a cell in the at least one cell;
  a cell not in the at least one cell; or
  a primary cell.

The first preset cell and the second preset cell may be the same or different.

In this embodiment of this disclosure, optionally, the transmitting a first PUCCH of at least one cell by using determined spatial relation information includes:

within a first preset period of time, transmitting the first PUCCH of the at least one cell by using the determined spatial relation information.

In this embodiment of this disclosure, optionally, the first preset period of time starts from one of the following:

(1) when the first preset condition is satisfied.

That is, when the first preset condition is satisfied, the first PUCCH of the at least one cell can be immediately transmitted by using the determined spatial relation information.

For example, the first preset period of time may start when the terminal receives, in the first preset cell, the downlink information transmitted by the network side (for example, from the last symbol of the downlink information).

(2) when second preset duration elapses after the first preset condition is satisfied.

The second preset duration is, for example, duration T.

That is, after the second preset duration elapses from the time at which the first preset condition is satisfied, the first PUCCH of the at least one cell may be then transmitted by using the determined spatial relation information.

For example, the first preset period of time may start when the duration T (namely, the second preset duration) elapses after the terminal receives, in the first preset cell, the downlink information transmitted by the network side (for example, after the last symbol of the downlink information).

In this embodiment of this disclosure, optionally, the second preset duration is K symbols or K slots. For example, K is 28 symbols.

In some embodiments of this disclosure, if the first preset condition is that downlink information transmitted by the network side is received in the first preset cell, K is determined in one of the following manners:

if the first PUCCH and the first preset cell are on carriers of different bands, and the first preset cell is on a carrier of a frequency range (FR) 1, determining is performed based on a subcarrier spacing of a carrier in which the first PUCCH is located;

if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;

if the first PUCCH and the first preset cell are on different carriers of a same band, determining is performed based on the subcarrier spacing of the carrier in which the first PUCCH is located or the subcarrier spacing of the carrier in which the first preset cell is located; or if the first PUCCH and the first preset cell are on a same carrier, determining is performed based on a subcarrier spacing of the same carrier.

In some embodiments of this disclosure, if the first preset condition is that the beam failure recovery request message is transmitted to the network side for N times in the second preset cell; or that the beam failure recovery request message is transmitted to the network side for N times in the second preset cell, and downlink information transmitted by the network side has not been received in the first preset cell within the first preset duration.

K is determined in one of the following manners:

if the first PUCCH and the second preset cell are on carriers of different bands, and the second preset cell is on a carrier of FR1, determining is performed based on a subcarrier spacing of a carrier in which the first PUCCH is located;

if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;

if the first PUCCH and the second preset cell are on different carriers of a same band, determining is performed based on the subcarrier spacing of the carrier in which the first PUCCH is located or the subcarrier spacing of the carrier in which the second preset cell is located; or if the first PUCCH and the second preset cell are on a same carrier, determining is performed based on a subcarrier spacing of the same carrier.

In this embodiment of this disclosure, optionally, the first preset period of time ends when the terminal receives configuration information, reconfiguration information, or an activation command for the spatial relation information of the first PUCCH from the network side.

In this embodiment of this disclosure, optionally, the first PUCCH of the at least one cell includes one of the following:

(1) all PUCCHs of the at least one cell;

(2) all PUCCHs of a third preset cell in the at least one cell; where the third preset cell is, for example, a cell with a preset cell index in the at least one cell.

(3) a preset PUCCH of the at least one cell; where the preset PUCCH is, for example, a PUCCH with a preset PUCCH resource index in the at least one cell; or (4) a preset PUCCH of the third preset cell in the at least one cell The third preset cell is, for example, a cell with a preset cell index.

The preset PUCCH is, for example, a PUCCH with a preset PUCCH resource index in the at least one cell or in a third preset cell of the at least one cell.

In this embodiment of this disclosure, optionally, the spatial relation information is determined in one of the following manners:

using spatial relation information of an uplink channel for transmitting a beam failure recovery request message in the at least one cell;

using spatial relation information of a preset channel in a fourth preset cell of the at least one cell;

using QCL information of a preset channel in a fourth preset cell of the at least one cell;

using spatial relation information of a preset reference signal in a fourth preset cell of the at least one cell;

using QCL information of a preset reference signal in a fourth preset cell of the at least one cell;

using spatial relation information of a preset channel in a fifth preset cell;

using QCL information of a preset channel in a fifth preset cell;

using spatial relation information of a preset reference signal in a fifth preset cell;

using QCL information of a preset reference signal in a fifth preset cell;

using spatial relation information of a preset channel in a primary cell;

using QCL information of a preset channel in a primary cell;

using spatial relation information of a preset reference signal in a primary cell; or using QCL information of a preset reference signal in a primary cell.

In this embodiment of this disclosure, optionally, the uplink channel is a contention-free PRACH only; or the uplink channel is a contention-free PRACH or a contention-based PRACH; or the uplink channel is a PUCCH; or the uplink channel is an uplink channel corresponding to a MAC CE (for example, a physical uplink shared channel (PUSCH)).

In this embodiment of this disclosure, optionally, the fourth preset cell is one of the following:

a cell without a beam failure in the at least one cell; or a cell with a beam failure in the at least one cell.

In this embodiment of this disclosure, optionally, the fifth preset cell is one of the following:

a cell not in the at least one cell;

a cell without a beam failure in the at least one cell; or a cell with a beam failure in the at least one cell.

In this embodiment of this disclosure, optionally, the preset channel is one of the following:

a PUCCH;

a PRACH;

a PUSCH;

a PDCCH; or a physical downlink shared channel (PDSCH).

In this embodiment of this disclosure, optionally, the preset reference signal is one of the following:

a sounding reference signal (SRS);

a channel state information reference signal (CSI-RS);

a synchronization signal/physical broadcast channel signal block (or synchronization signal block) (Synchronization Signal and PBCH block, SSB);

a tracking reference signal (TRS); or a phase-tracking reference signal (PTRS).

In this embodiment of this disclosure, it is clarified that in a multi-carrier system, how to determine the beam information of the PUCCH of the at least one cell in a case that the beam failure event occurs and the beam failure recovery is performed, so that the network side and the terminal have consistent beam information of the PUCCH, thereby ensuring performance of PUCCH transmission.

Referring to FIG. 3. FIG. 3 is a schematic flowchart of a method for PUCCH reception according to an embodiment of this disclosure. The method for PUCCH reception is applied to a network-side device and includes the following step.

Step 31: Receive a first PUCCH of at least one cell by using determined spatial relation information after receiving a beam failure recovery request message transmitted by a terminal, where the at least one cell includes: a primary cell and at least one secondary cell, or at least one secondary cell.

In this embodiment of this disclosure, optionally, the receiving a first PUCCH of at least one cell by using determined spatial relation information includes:

if a second preset condition is satisfied, receiving the first PUCCH of the at least one cell by using the determined spatial relation information.

In this embodiment of this disclosure, optionally, the second preset condition includes one of the following:

downlink information is transmitted in a first preset cell; or the beam failure recovery request message is received for N times in a second preset cell, where N is a positive integer greater than or equal to 1.

In this embodiment of this disclosure, optionally, the downlink information includes one of the following:

(1) PDCCH on a CORESET-BFR

Optionally, the PDCCH is a PDCCH indicated by a high-layer parameter and corresponding to a DCI format whose CRC is scrambled by a C-RNTI or an MCS-C-RNTI in a search space set of a control resource set for transmitting beam failure recovery request response information.

(2) DCI

Optionally, the DCI includes one of the following:

DCI used for indicating the terminal to re-perform beam training;

DCI used for indicating the terminal to re-perform beam selection;

DCI used for scheduling downlink channel transmission;

DCI used for scheduling uplink channel transmission;

DCI used for scheduling downlink reference signal transmission; or

DCI used for scheduling uplink reference signal transmission.

(3) RAR (4) A Release Command Used for Releasing a Cell in which a Beam Failure Occurs (5) Scheduling Information for a Cell with a Beam Failure (6) First Trigger Information for a Cell with a Beam Failure, where the First Trigger Information is Used to Trigger Beam Measurement and/or Beam Reporting (7) Second Trigger Information for a Cell with a Beam Failure, where the Second Trigger Information is Used to Trigger SI Measurement and/or CSI Reporting (8) ACK or NACK Corresponding to Scheduling Information for a Cell with a Beam Failure Optionally, the scheduling information, the first trigger information, or the second trigger information is used for cross-carrier scheduling.

Optionally, the first preset cell used for transmitting the downlink information is one of the following:

a cell with a beam failure;

a cell without a beam failure;

a cell in the at least one cell;

a cell not in the at least one cell; or a primary cell.

Optionally, the second preset cell used for receiving the beam failure recovery request message is one of the following:

a cell with a beam failure;

a cell without a beam failure;

a cell in the at least one cell;

a cell not in the at least one cell; or a primary cell.

In this embodiment of this disclosure, optionally, the receiving a first PUCCH of at least one cell by using determined spatial relation information includes:

within a second preset period of time, receiving the first PUCCH of the at least one cell by using the determined spatial relation information.

In this embodiment of this disclosure, optionally, the second preset period of time starts from one of the following:

(1) when the second preset condition is satisfied.

That is, when the second preset condition is satisfied, the network-side device can immediately receive the first PUCCH of the at least one cell by using the determined spatial relation information.

For example, the second preset period of time may start when the network side transmits the downlink information (for example, from the last symbol of the downlink information).

(2) when third preset duration elapses after the second preset condition is satisfied.

That is, after the third preset duration elapses from the time at which the second preset condition is satisfied, the first PUCCH of the at least one cell can be immediately received by the network-side device by using the determined spatial relation information.

For example, the second preset period of time may start when the duration T (namely, the third preset duration) elapses after the network side transmits the downlink information (for example, after the last symbol of the downlink information).

In this embodiment of this disclosure, the third preset duration may be the same as or different from the second preset duration.

For example, if the network side transmits the downlink information to the terminal after receiving the beam failure recovery request message transmitted by the terminal, the network side may receive the first PUCCH of the at least one cell by using the determined spatial relation information after the third preset duration elapses from transmission of the downlink information. However, the terminal may transmit the first PUCCH of the at least one cell by using the determined spatial relation information after the second preset duration elapses from receiving of the downlink information. In this case, the second preset duration may be the same as the third preset duration.

If the network side transmits the downlink information to the terminal after receiving the beam failure recovery request message transmitted by the terminal, the network side may receive the first PUCCH of the at least one cell by using the determined spatial relation information after the third preset duration elapses from transmission of the downlink information. However, if the terminal does not receive the downlink information within the first preset duration, the terminal may transmit the first PUCCH of the at least one cell by using the determined spatial relation information after the second preset duration elapses from a time of not receiving the downlink information. In this case, the second preset duration may be different from or the same as the third preset duration.

If the network side does not transmit the downlink information to the terminal after receiving the beam failure recovery request message transmitted by the terminal, the network side may receive the first PUCCH of the at least one cell by using the determined spatial relation information after the third preset duration elapses from receiving of the beam failure recovery request message transmitted by the terminal. However, if the terminal does not receive the downlink information within the first preset duration, the terminal may transmit the first PUCCH of the at least one cell by using the determined spatial relation information after the second preset duration elapses from the time of not receiving the downlink information. In this case, the second preset duration may be different from or the same as the third preset duration.

In this embodiment of this disclosure, optionally, the third preset duration is F symbols or F slots.

In this embodiment of this disclosure, optionally, if the second preset condition is that the downlink information is transmitted in the first preset cell, F is determined in one of the following manners:

if the first PUCCH and the first preset cell are on carriers of different bands, and the first preset cell is on a carrier of FR1, determining is performed based on a subcarrier spacing of a carrier in which the first PUCCH is located;

if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;

if the first PUCCH and the first preset cell are on different carriers of a same band, determining is performed based on the subcarrier spacing of the carrier in which the first PUCCH is located or the subcarrier spacing of the carrier in which the first preset cell is located; or if the first PUCCH and the first preset cell are on a same carrier, determining is performed based on a subcarrier spacing of the same carrier.

In this embodiment of this disclosure, optionally, if the second preset condition is that the beam failure recovery request message is received for N times in the second preset cell, F is determined in one of the following manners:

if the first PUCCH and the second preset cell are on carriers of different bands, and the second preset cell is on a carrier of FR1, determining is performed based on a subcarrier spacing of a carrier in which the first PUCCH is located;

if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;

if the first PUCCH and the second preset cell are on different carriers of a same band, determining is performed based on the subcarrier spacing of the carrier in which the first PUCCH is located or the subcarrier spacing of the carrier in which the second preset cell is located; or if the first PUCCH and the second preset cell are on a same carrier, determining is performed based on a subcarrier spacing of the same carrier.

In this embodiment of this disclosure, optionally, the first PUCCH of the at least one cell includes one of the following:

all PUCCHs of the at least one cell;
all PUCCHs of a third preset cell in the at least one cell;
a preset PUCCH of the at least one cell; or
a preset PUCCH of the third preset cell in the at least one cell.

The third preset cell is, for example, a cell with a preset cell index in the at least one cell.

The preset PUCCH is, for example, a PUCCH with a preset PUCCH resource index in the at least one cell or in a third preset cell of the at least one cell.

In this embodiment of this disclosure, optionally, the spatial relation information is determined in one of the following manners:

using spatial relation information of an uplink channel for receiving a beam failure recovery request message in the at least one cell;

using spatial relation information of a preset channel in a fourth preset cell of the at least one cell;

using QCL information of a preset channel in a fourth preset cell of the at least one cell;

using spatial relation information of a preset reference signal in a fourth preset cell of the at least one cell;

using QCL information of a preset reference signal in a fourth preset cell of the at least one cell;

using spatial relation information of a preset channel in a fifth preset cell;

using QCL information of a preset channel in a fifth preset cell;

using spatial relation information of a preset reference signal in a fifth preset cell;

using QCL information of a preset reference signal in a fifth preset cell;

using spatial relation information of a preset channel in a primary cell;

using QCL information of a preset channel in a primary cell;

using spatial relation information of a preset reference signal in a primary cell; or using QCL information of a preset reference signal in a primary cell.

In this embodiment of this disclosure, optionally, the uplink channel is a contention-free PRACH only; or the uplink channel is a contention-free PRACH or a contention-based PRACH; or the uplink channel is a PUCCH; or the uplink channel is an uplink channel corresponding to a MAC CE.

In this embodiment of this disclosure, optionally, the fourth preset cell is one of the following:

a cell without a beam failure in the at least one cell; or a cell with a beam failure in the at least one cell.

In this embodiment of this disclosure, optionally, the fifth preset cell is one of the following:

a cell not in the at least one cell;

a cell without a beam failure in the at least one cell; or a cell with a beam failure in the at least one cell.

In this embodiment of this disclosure, optionally, the preset channel is one of the following:

a PUCCH;

a PRACH;

a PUSCH;

a PDCCH; or a PDSCH.

In this embodiment of this disclosure, optionally, the preset reference signal is one of the following:

an SRS;

a CSI-RS;

an SSB;

a TRS; or a PTRS.

In this embodiment of this disclosure, it is clarified that in a multi-carrier system, how to determine the beam information of the PUCCH of the at least one cell in a case that the beam failure event occurs and the beam failure recovery is performed, so that the network side and the terminal have consistent beam information of the PUCCH, thereby ensuring performance of PUCCH transmission.

Referring to FIG. 4, FIG. 4 is a schematic flowchart of a method for PUCCH transmission according to another embodiment of this disclosure. The method is applied to a terminal and includes the following step.

Step 41: Skip transmitting a first PUCCH of at least one cell after transmitting a beam failure recovery request message to a network side, where the at least one cell includes: a primary cell and at least one secondary cell, or at least one secondary cell.

Optionally, the skipping transmitting the first PUCCH of the at least one cell includes:

skipping transmitting the first PUCCH of the at least one cell if downlink information transmitted by the network side has not been received in a first preset cell within fourth preset duration.

The fourth preset duration may be configured by the network side, or may be specified by a protocol. The fourth preset duration may be a time length equal to or greater than 0.

Optionally, the skipping transmitting the first PUCCH of the at least one cell includes:

skipping transmitting the first PUCCH of the at least one cell in a third preset period of time.

Optionally, the third preset period of time starts at the end of the fourth preset duration, and the third preset period of time ends when configuration information, reconfiguration information, or an activation command for spatial relation information of the first PUCCH is received from the network side.

For the downlink information, refer to the downlink information in the embodiment shown in FIG. 2. Details are not repeated herein.

For the first PUCCH, refer to the first PUCCH in the embodiment shown in FIG. 2. Details are not repeated herein.

Referring to FIG. 5, FIG. 5 is a schematic flowchart of a method for PUCCH reception according to another embodiment of this disclosure. The method is applied to a network side and includes the following step.

Step 51: Skip receiving a first PUCCH of at least one cell after receiving a beam failure recovery request message transmitted by a terminal, where the at least one cell includes: a primary cell and at least one secondary cell, or at least one secondary cell.

Optionally, the skipping receiving the first PUCCH of the at least one cell includes:

skipping receiving the first PUCCH of the at least one cell in a fourth preset period of time.

Optionally, the fourth preset period of time starts when the beam failure recovery request message transmitted by the terminal is received, and the fourth preset period of time ends when configuration information, reconfiguration information, or an activation command for spatial relation information of the first PUCCH from the network side is transmitted to the terminal.

For the first PUCCH, refer to the first PUCCH in the embodiment shown in FIG. 3. Details are not repeated herein.

Figure 6:
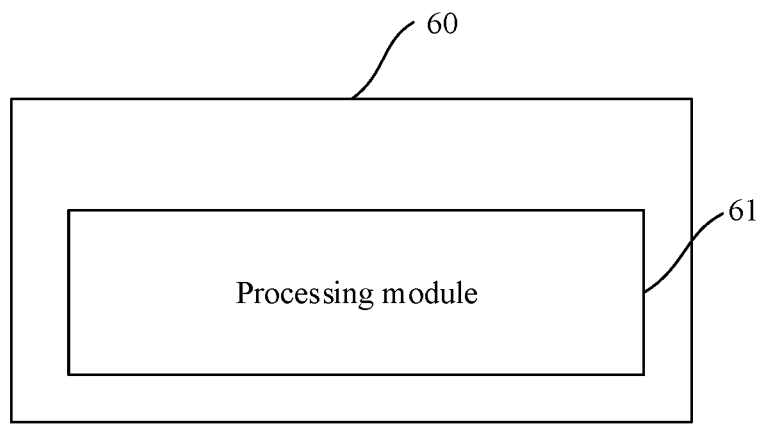
FIG. 6 is a schematic structural diagram of a terminal according to an embodiment of this disclosure.

Referring to FIG. 6, FIG. 6 is a schematic structural diagram of a terminal according to an embodiment of this disclosure. The terminal 40 includes:

a processing module 61, configured to transmit a first PUCCH of at least one cell by using determined spatial relation information after transmitting a beam failure recovery request message to a network side, where the at least one cell includes: a primary cell and at least one secondary cell, or at least one secondary cell.

In this embodiment of this disclosure, optionally, the processing module 61 is configured to: if a first preset condition is satisfied, transmit the first PUCCH of the at least one cell by using the determined spatial relation information.

In this embodiment of this disclosure, optionally, the first preset condition includes one of the following:

downlink information transmitted by the network side is received in a first preset cell;

the beam failure recovery request message is transmitted to the network side for N times in a second preset cell; or the beam failure recovery request message is transmitted to the network side for N times in the second preset cell, and downlink information transmitted by the network side has not been received in the first preset cell within a first preset duration; where N is an integer greater than or equal to 1.

In this embodiment of this disclosure, optionally, the downlink information includes one of the following:

a PDCCH on a CORESET-BFR;
DCI;
a RAR;
a release command used for releasing a cell in which a beam failure occurs;
scheduling information for a cell with a beam failure;
first trigger information for a cell with a beam failure, where the first trigger information is used to trigger beam measurement and/or beam reporting;
second trigger information for a cell with a beam failure, where the second trigger information is used to trigger SI measurement and/or CSI reporting;
an ACK corresponding to scheduling information for a cell with a beam failure; or
a NACK corresponding to scheduling information for a cell with a beam failure.

In this embodiment of this disclosure, optionally, the PDCCH is a PDCCH indicated by a high-layer parameter and corresponding to a DCI format whose CRC is scrambled by a C-RNTI or an MCS-C-RNTI in a search space set of a control resource set for transmitting beam failure recovery request response information.

In this embodiment of this disclosure, optionally, the DCI includes one of the following:

DCI used for indicating the terminal to re-perform beam training;
DCI used for indicating the terminal to re-perform beam selection;
DCI used for scheduling downlink channel transmission;
DCI used for scheduling uplink channel transmission;
DCI used for scheduling downlink reference signal transmission; or
DCI used for scheduling uplink reference signal transmission.

In this embodiment of this disclosure, optionally, the downlink information includes the RAR; and the transmitting, by the terminal, a beam failure recovery request message to a network side includes:

transmitting, by the terminal, the beam failure recovery request message to the network side by using a contention-based PRACH.

In this embodiment of this disclosure, optionally, the scheduling information, the first trigger information, or the second trigger information is used for cross-carrier scheduling.

In this embodiment of this disclosure, optionally, the transmitting, by the terminal, a beam failure recovery request message to a network side includes: transmitting, by the terminal, the beam failure recovery request message to the network side by using a PRACH, a MAC CE, or a second PUCCH.

In this embodiment of this disclosure, optionally, the first preset cell is one of the following:

a cell with a beam failure;
a cell without a beam failure;
a cell in the at least one cell;
a cell not in the at least one cell; or
a primary cell.

In this embodiment of this disclosure, optionally, the second preset cell is one of the following:

a cell with a beam failure;
a cell without a beam failure;
a cell in the at least one cell;
a cell not in the at least one cell; or
a primary cell.

In this embodiment of this disclosure, optionally, the processing module 61 is configured to: within a first preset period of time, transmit the first PUCCH of the at least one cell by using the determined spatial relation information.

In this embodiment of this disclosure, optionally, the first preset period of time starts from one of the following:

when the first preset condition is satisfied; or
when second preset duration elapses after the first preset condition is satisfied.

In this embodiment of this disclosure, optionally, the second preset duration is K symbols or K slots.

In this embodiment of this disclosure, optionally, if the first preset condition is that downlink information transmitted by the network side is received in the first preset cell, K is determined in one of the following manners:

if the first PUCCH and the first preset cell are on carriers of different bands, and the first preset cell is on a carrier of FR1, determining is performed based on a subcarrier spacing of a carrier in which the first PUCCH is located;
if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;
if the first PUCCH and the first preset cell are on different carriers of a same band, determining is performed based on the subcarrier spacing of the carrier in which the first PUCCH is located or the subcarrier spacing of the carrier in which the first preset cell is located; or
if the first PUCCH and the first preset cell are on a same carrier, determining is performed based on a subcarrier spacing of the same carrier.

In this embodiment of this disclosure, optionally, if the first preset condition is that the beam failure recovery request message is transmitted to the network side for N times in the second preset cell; or that the beam failure recovery request message is transmitted to the network side for N times in the second preset cell, and downlink information transmitted by the network side has not been received in the first preset cell within the first preset duration.

K is determined in one of the following manners:

if the first PUCCH and the second preset cell are on carriers of different bands, and the second preset cell is on a carrier of FR1, determining is performed based on a subcarrier spacing of a carrier in which the first PUCCH is located;
if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;
if the first PUCCH and the second preset cell are on different carriers of a same band, determining is performed based on the subcarrier spacing of the carrier in which the first PUCCH is located or the subcarrier spacing of the carrier in which the second preset cell is located; or if the first PUCCH and the second preset cell are on a same carrier, determining is performed based on a subcarrier spacing of the same carrier.

In this embodiment of this disclosure, optionally, the first preset period of time ends when the terminal receives configuration information, reconfiguration information, or an activation command for spatial relation information of the first PUCCH from the network side.

In this embodiment of this disclosure, optionally, the first PUCCH of the at least one cell includes one of the following:
- all PUCCHs of the at least one cell;
- all PUCCHs of a third preset cell in the at least one cell;
- a preset PUCCH of the at least one cell; or
- a preset PUCCH of the third preset cell in the at least one cell.

The third preset cell is, for example, a cell with a preset cell index in the at least one cell.

The preset PUCCH is, for example, a PUCCH with a preset PUCCH resource index in the at least one cell or in a third preset cell of the at least one cell.

In this embodiment of this disclosure, optionally, the spatial relation information is determined in one of the following manners:
- using spatial relation information of an uplink channel for transmitting a beam failure recovery request message in the at least one cell;
- using spatial relation information of a preset channel in a fourth preset cell of the at least one cell;
- using quasi co-location QCL information of a preset channel in a fourth preset cell of the at least one cell;
- using spatial relation information of a preset reference signal in a fourth preset cell of the at least one cell;
- using QCL information of a preset reference signal in a fourth preset cell of the at least one cell;
- using spatial relation information of a preset channel in a fifth preset cell;
- using QCL information of a preset channel in a fifth preset cell;
- using spatial relation information of a preset reference signal in a fifth preset cell;
- using QCL information of a preset reference signal in a fifth preset cell;
- using spatial relation information of a preset channel in a primary cell;
- using QCL information of a preset channel in a primary cell;
- using spatial relation information of a preset reference signal in a primary cell; or
- using QCL information of a preset reference signal in a primary cell.

In this embodiment of this disclosure, optionally, the uplink channel is a contention-free PRACH only; or
- the uplink channel is a contention-free PRACH or a contention-based PRACH; or
- the uplink channel is a PUCCH; or
- the uplink channel is an uplink channel corresponding to a MAC CE.

In this embodiment of this disclosure, optionally, the fourth preset cell is one of the following:
- a cell without a beam failure in the at least one cell; or
- a cell with a beam failure in the at least one cell.

In this embodiment of this disclosure, optionally, the fifth preset cell is one of the following:
- a cell not in the at least one cell;
- a cell without a beam failure in the at least one cell; or
- a cell with a beam failure in the at least one cell.

In this embodiment of this disclosure, optionally, the preset channel is one of the following:
- a PUCCH;
- a PRACH;
- a PUSCH;
- a PDCCH; or
- a PDSCH.

In this embodiment of this disclosure, optionally, the preset reference signal is one of the following:
- an SRS;
- a CSI-RS;
- an SSB;
- a TRS; or
- a PTRS.

Figure 7:
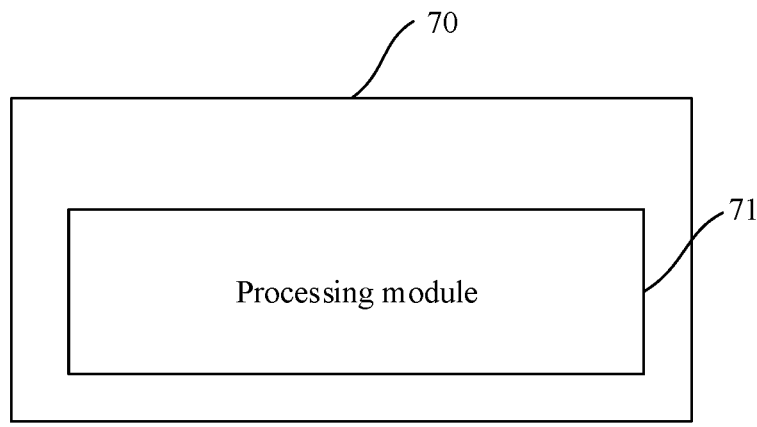
FIG. 7 is a schematic structural diagram of a network-side device according to an embodiment of this disclosure.

Referring to FIG. 7, FIG. 7 is a schematic structural diagram of a network-side device according to an embodiment of this disclosure. The network-side device 70 includes:

a processing module 71, configured to receive a first PUCCH of at least one cell by using determined spatial relation information after receiving a beam failure recovery request message transmitted by a terminal, where the at least one cell includes: a primary cell and at least one secondary cell, or at least one secondary cell.

In this embodiment of this disclosure, optionally, the processing module 71 is configured to: if a second preset condition is satisfied, receive the first PUCCH of the at least one cell by using the determined spatial relation information.

In this embodiment of this disclosure, optionally, the second preset condition includes one of the following:
- downlink information is transmitted in a first preset cell; or
- the beam failure recovery request message is received for N times in a second preset cell, where N is a positive integer greater than or equal to 1.

In this embodiment of this disclosure, optionally, the downlink information includes one of the following:
- a PDCCH on a CORESET-BFR;
- DCI;
- a RAR;
- a release command used for releasing a cell in which a beam failure occurs;
- scheduling information for a cell with a beam failure;
- first trigger information for a cell with a beam failure, where the first trigger information is used to trigger beam measurement and/or beam reporting;
- second trigger information for a cell with a beam failure, where the second trigger information is used to trigger SI measurement and/or CSI reporting; or
- an ACK or NACK corresponding to scheduling information for a cell with a beam failure.

In this embodiment of this disclosure, optionally, the PDCCH is a PDCCH indicated by a high-layer parameter and corresponding to a DCI format whose CRC is scrambled by a C-RNTI or an MCS-C-RNTI in a search space set of a control resource set for transmitting beam failure recovery request response information.

In this embodiment of this disclosure, optionally, the DCI includes one of the following:
- DCI used for indicating the terminal to re-perform beam training;
- DCI used for indicating the terminal to re-perform beam selection;

DCI used for scheduling downlink channel transmission;
DCI used for scheduling uplink channel transmission;
DCI used for scheduling downlink reference signal transmission; or
DCI used for scheduling uplink reference signal transmission.

In this embodiment of this disclosure, optionally, the scheduling information, the first trigger information, or the second trigger information is used for cross-carrier scheduling.

In this embodiment of this disclosure, optionally, the first preset cell is one of the following:
   a cell with a beam failure;
   a cell without a beam failure;
   a cell in the at least one cell;
   a cell not in the at least one cell; or
   a primary cell.

In this embodiment of this disclosure, optionally, the second preset cell is one of the following:
   a cell with a beam failure;
   a cell without a beam failure;
   a cell in the at least one cell;
   a cell not in the at least one cell; or
   a primary cell.

In this embodiment of this disclosure, optionally, the processing module 71 is configured to: within a second preset period of time, receive the first PUCCH of the at least one cell by using the determined spatial relation information.

In this embodiment of this disclosure, optionally, the second preset period of time starts from one of the following:
   when the second preset condition is satisfied; or
   when third preset duration elapses after the second preset condition is satisfied.

In this embodiment of this disclosure, optionally, the third preset duration is F symbols or F slots.

In this embodiment of this disclosure, optionally, if the second preset condition is that the downlink information is transmitted in the first preset cell, F is determined in one of the following manners:
   if the first PUCCH and the first preset cell are on carriers of different bands, and the first preset cell is on a carrier of FR1, determining is performed based on a subcarrier spacing of a carrier in which the first PUCCH is located;
   if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;
   if the first PUCCH and the first preset cell are on different carriers of a same band, determining is performed based on the subcarrier spacing of the carrier in which the first PUCCH is located or the subcarrier spacing of the carrier in which the first preset cell is located; or
   if the first PUCCH and the first preset cell are on a same carrier, determining is performed based on a subcarrier spacing of the same carrier.

In this embodiment of this disclosure, optionally, if the second preset condition is that the beam failure recovery request message is received for N times in the second preset cell, F is determined in one of the following manners:
   if the first PUCCH and the second preset cell are on carriers of different bands, and the second preset cell is on a carrier of FR1, determining is performed based on a subcarrier spacing of a carrier in which the first PUCCH is located;
   if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;
   if the first PUCCH and the second preset cell are on different carriers of a same band, determining is performed based on the subcarrier spacing of the carrier in which the first PUCCH is located or the subcarrier spacing of the carrier in which the second preset cell is located; or
   if the first PUCCH and the second preset cell are on a same carrier, determining is performed based on a subcarrier spacing of the same carrier.

In this embodiment of this disclosure, optionally, the first PUCCH of the at least one cell includes one of the following:
   all PUCCHs of the at least one cell;
   all PUCCHs of a third preset cell in the at least one cell;
   a preset PUCCH of the at least one cell; or
   a preset PUCCH of the third preset cell in the at least one cell.

The third preset cell is, for example, a cell with a preset cell index in the at least one cell.

The preset PUCCH is, for example, a PUCCH with a preset PUCCH resource index in the at least one cell or in a third preset cell of the at least one cell.

In this embodiment of this disclosure, optionally, the spatial relation information is determined in one of the following manners:
   using spatial relation information of an uplink channel for receiving a beam failure recovery request message in the at least one cell;
   using spatial relation information or QCL information of a preset channel in a fourth preset cell of the at least one cell;
   using spatial relation information or QCL information of a preset reference signal in a fourth preset cell of the at least one cell;
   using spatial relation information of a preset channel in a fifth preset cell;
   using QCL information of a preset channel in a fifth preset cell;
   using spatial relation information of a preset reference signal in a fifth preset cell;
   using QCL information of a preset reference signal in a fifth preset cell;
   using spatial relation information of a preset channel in a primary cell;
   using QCL information of a preset channel in a primary cell;
   using spatial relation information of a preset reference signal in a primary cell; or
   using QCL information of a preset reference signal in a primary cell.

In this embodiment of this disclosure, optionally, the uplink channel is a contention-free PRACH only; or
   the uplink channel is a contention-free PRACH or a contention-based PRACH; or
   the uplink channel is a PUCCH; or
   the uplink channel is an uplink channel corresponding to a MAC CE.

In this embodiment of this disclosure, optionally, the fourth preset cell is one of the following:
  a cell without a beam failure in the at least one cell; or
  a cell with a beam failure in the at least one cell.

In this embodiment of this disclosure, optionally, the fifth preset cell is one of the following:
  a cell not in the at least one cell;
  a cell without a beam failure in the at least one cell; or
  a cell with a beam failure in the at least one cell.

In this embodiment of this disclosure, optionally, the preset channel is one of the following:
  a PUCCH;
  a PRACH;
  a PUSCH;
  a PDCCH; or
  a PDSCH.

In this embodiment of this disclosure, optionally, the preset reference signal is one of the following:
  an SRS;
  a CSI-RS;
  an SSB;
  a TRS; or
  a PTRS.

Figure 8:
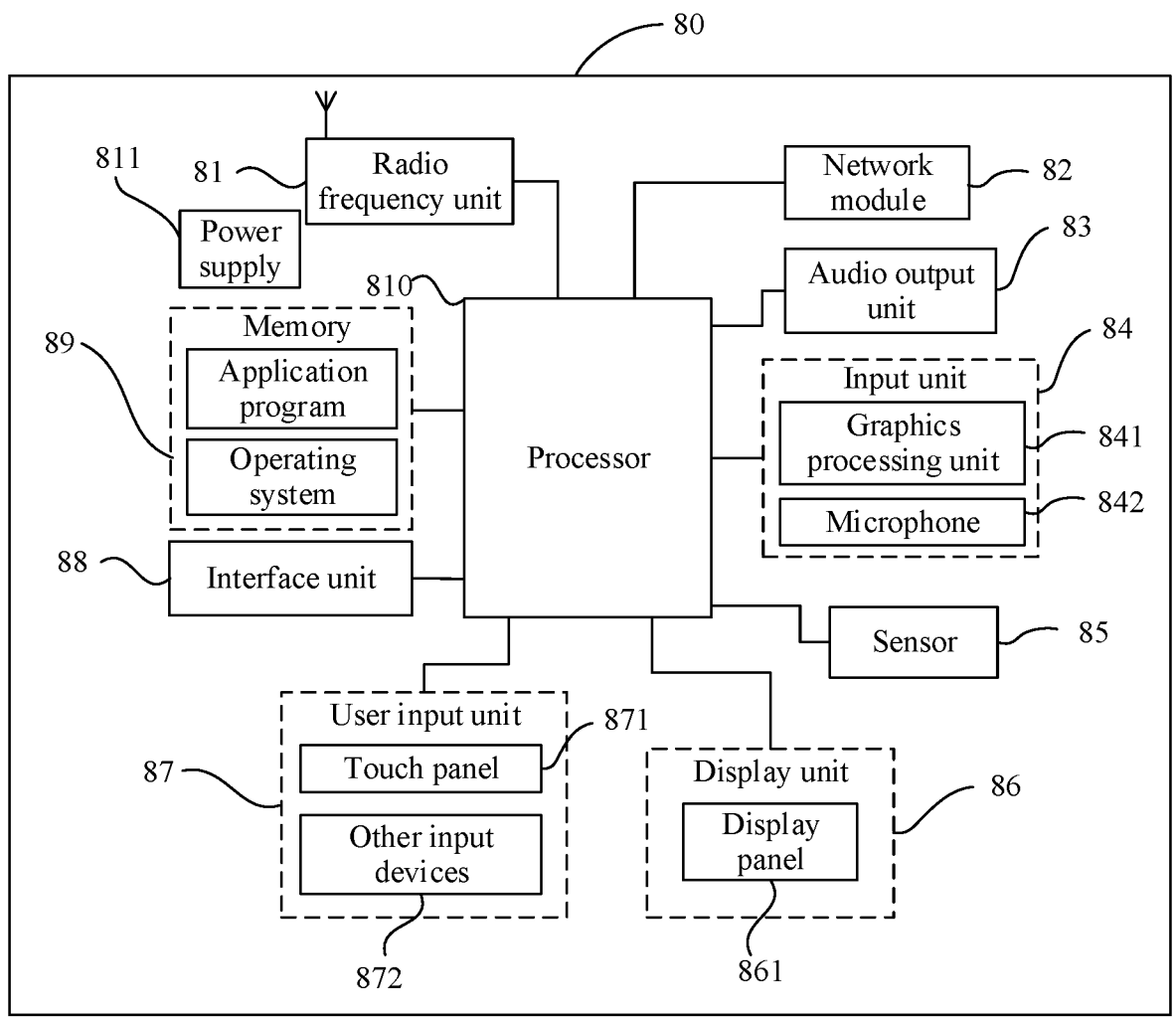
FIG. 8 is a schematic structural diagram of a terminal according to another embodiment of this disclosure.

Referring to FIG. 8, FIG. 8 is a schematic structural diagram of a terminal according to another embodiment of this disclosure. The terminal 80 includes but is not limited to components such as a radio frequency unit 81, a network module 82, an audio output unit 83, an input unit 84, a sensor 85, a display unit 86, a user input unit 87, an interface unit 88, a memory 89, a processor 810, and a power supply 811. A person skilled in the art may understand that the structure of the terminal shown in FIG. 8 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a laptop computer, a personal digital assistant, an in-vehicle terminal, a wearable device, a pedometer, and the like.

The processor 810 is configured to transmit a first PUCCH of at least one cell by using determined spatial relation information after transmitting a beam failure recovery request message to a network side, where the at least one cell includes: a primary cell and at least one secondary cell, or at least one secondary cell.

In this embodiment of this disclosure, it is clarified that in a multi-carrier system, how to determine the beam information of the PUCCH of the at least one cell in a case that the beam failure event occurs and the beam failure recovery is performed, so that the network side and the terminal have consistent beam information of the PUCCH, thereby ensuring performance of PUCCH transmission.

It should be understood that, in this embodiment of this disclosure, the radio frequency unit 81 may be configured to: receive and transmit signals in an information receiving/transmitting process or a call process; and specifically, after receiving downlink data from a base station, transmit the downlink information to the processor 810 for processing, and in addition, transmit uplink data to the base station. Generally, the radio frequency unit 81 includes but is not limited to an antenna, at least one amplifier, a transceiver, a coupler, a low noise amplifier, a duplexer, and the like. In addition, the radio frequency unit 81 may also communicate with a network and other devices via a wireless communications system.

The terminal provides a user with wireless broadband internet access through the network module 82, for example, helping the user to transmit and receive e-mails, browse web pages, and access streaming media.

The audio output unit 83 may convert audio data received by the radio frequency unit 81 or the network module 82 or stored in the memory 89 into an audio signal and output the audio signal as a sound. Furthermore, the audio output unit 83 may also provide audio output (for example, a call signal received sound or a message received sound) related to a specific function performed by the terminal 80. The audio output unit 83 includes a speaker, a buzzer, a receiver, and the like.

The input unit 84 is configured to receive an audio or video signal. The input unit 84 may include a graphics processing unit (GPU) 841 and a microphone 842. The graphics processing unit 841 processes image data of a still picture or video obtained by an image capture apparatus (such as a camera) in a video capture mode or an image capture mode. A processed image frame may be displayed on the display unit 86. The image frame processed by the graphics processing unit 841 may be stored in the memory 89 (or another storage medium) or be transmitted by the radio frequency unit 81 or the network module 82. The microphone 842 is capable of receiving sounds and processing such sounds into audio data. The processed audio data may be converted in a telephone call mode into a format that can be transmitted by the radio frequency unit 81 to a mobile communications base station, for outputting.

The terminal 80 may further include at least one sensor 85, for example, an optical sensor, a motion sensor, and other sensors. Specifically, the optical sensor may include an ambient light sensor and a proximity sensor. The ambient light sensor may adjust luminance of the display panel 861 based on brightness of ambient light, and the proximity sensor may turn off the display panel 861 and/or backlight when the terminal 80 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 85 may also include a fingerprint sensor, a pressure sensor, an iris sensor, a molecular sensor, a gyroscope, a barometer, a hygrometer, a thermometer, an infrared sensor, and the like. Details are not described herein.

The display unit 86 is configured to display information input by the user or information provided to the user. The display unit 86 may include a display panel 861, and the display panel 861 may be configured in a form of a liquid crystal display (LCD), an organic light-emitting diode (OLED), or the like.

The user input unit 87 may be configured to receive input digit or character information and generate key signal input related to user setting and function control of the terminal. Specifically, the user input unit 87 may include a touch panel 871 and other input devices 872. The touch panel 871 is also referred to as a touchscreen and can collect a touch operation (such as an operation performed by the user on the touch panel 871 or near the touch panel 871 with a finger or by using any proper object or accessory such as a stylus) of the user on or near the touch panel 871. The touch panel 871 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 810, and can receive a command transmitted by the processor 810 and execute the command. In addition, the touch panel 871 may be implemented in a plurality of forms, for example, as a resistive, capacitive, infrared, or surface acoustic wave touch panel. In addition to the touch panel 871, the user input unit 87 may further include other input devices 872. Specifically, the other input devices 872 may include but are not limited to a physical keyboard, a function key (such as a volume control key or an on/off key), a trackball, a mouse, and a joystick. Details are not described herein.

Further, the touch panel 871 may cover the display panel 861. When detecting a touch operation on or near the touch panel 871, the touch panel 871 transmits the touch operation to the processor 810 to determine a type of a touch event. Then, the processor 810 provides a corresponding visual output on the display panel 861 based on the type of the touch event. Although in FIG. 8, the touch panel 871 and the display panel 861 act as two independent parts to implement input and output functions of the terminal, in some embodiments, the touch panel 871 and the display panel 861 may be integrated to implement the input and output functions of the terminal. This is not specifically limited herein.

The interface unit 88 is an interface between an external apparatus and the terminal 80. For example, the external apparatus may include a wired or wireless headset port, an external power supply (or a battery charger) port, a wired or wireless data port, a memory card port, a port for connecting an apparatus provided with a recognition module, an audio input/output (I/O) port, a video I/O port, an earphone port, and the like. The interface unit 88 may be configured to: receive input (for example, data information and power) from the external apparatus, and transmit the received input to one or more elements in the terminal 80, or may be configured to transmit data between the terminal 80 and the external apparatus.

The memory 89 may be configured to store software programs and various data. The memory 89 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 89 may include a high-speed random access memory, and may further include a non-volatile memory such as at least one disk storage device, a flash memory device, or another volatile solid-state storage device.

The processor 810 is a control center of the terminal, and is connected to all components of the terminal by using various interfaces and lines. By running or executing a software program and/or module that is stored in the memory 89 and calling data stored in the memory 89, the processor 810 executes various functions of the terminal and processes data, so as to perform overall monitoring on the terminal. The processor 810 may include one or more processing units. Optionally, an application processor and a modem processor may be integrated in the processor 810. The application processor primarily processes an operating system, user interfaces, application programs, and the like. The modem processor primarily processes radio communication. It can be understood that the modem processor may alternatively be not integrated in the processor 810.

The terminal 80 may further include the power supply 811 (for example, a battery) supplying power to all components. Optionally, the power supply 811 may be logically connected to the processor 810 through a power management system. In this way, functions such as charge management, discharge management, and power consumption management are implemented by using the power management system.

In addition, the terminal 80 includes some functional modules that are not shown. Details are not described herein.

Figure 9:
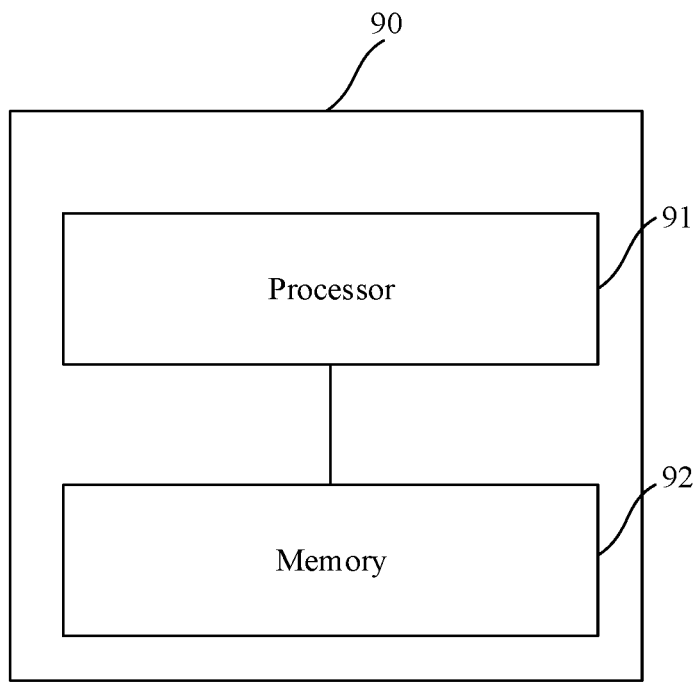
FIG. 9 is a schematic structural diagram of a terminal according to still another embodiment of this disclosure.

Referring to FIG. 9, FIG. 9 is a schematic structural diagram of a terminal according to another embodiment of this disclosure. The terminal 90 includes a processor 91 and a memory 92. In this embodiment of this disclosure, the terminal 90 further includes: a computer program stored in the memory 92 and capable of running on the processor 91. When the computer program is executed by the processor 91, the following steps are implemented: transmitting a first PUCCH of at least one cell by using determined spatial relation information after transmitting a beam failure recovery request message to a network side, where the at least one cell includes: a primary cell and at least one secondary cell, or at least one secondary cell.

The processor 91 is responsible for management of the bus architecture and general processing, and the memory 92 is capable of storing data that is used by the processor 91 during operation.

Optionally, when the computer program is executed by the processor 91, the following steps can further be implemented:

the transmitting a first PUCCH of at least one cell by using determined spatial relation information includes:

if a first preset condition is satisfied, transmitting the first PUCCH of the at least one cell by using the determined spatial relation information.

Optionally, the first preset condition includes one of the following:

downlink information transmitted by the network side is received in a first preset cell;

the beam failure recovery request message is transmitted to the network side for N times in a second preset cell; or the beam failure recovery request message is transmitted to the network side for N times in the second preset cell, and downlink information transmitted by the network side has not been received in the first preset cell within a first preset duration; where N is an integer greater than or equal to 1.

Optionally, the downlink information includes one of the following:

a PDCCH on a CORESET-BFR;

DCI;

a RAR;

a release command used for releasing a cell in which a beam failure occurs;

scheduling information for a cell with a beam failure;

first trigger information for a cell with a beam failure, where the first trigger information is used to trigger beam measurement and/or beam reporting;

second trigger information for a cell with a beam failure, where the second trigger information is used to trigger SI measurement and/or CSI reporting;

an ACK corresponding to scheduling information for a cell with a beam failure; or a NACK corresponding to scheduling information for a cell with a beam failure.

Optionally, the PDCCH is a PDCCH indicated by a high-layer parameter and corresponding to a DCI format whose CRC is scrambled by a C-RNTI or an MCS-C-RNTI in a search space set of a control resource set for transmitting beam failure recovery request response information.

Optionally, the DCI includes one of the following:
DCI used for indicating the terminal to re-perform beam training;
DCI used for indicating the terminal to re-perform beam selection;
DCI used for scheduling downlink channel transmission;
DCI used for scheduling uplink channel transmission;
DCI used for scheduling downlink reference signal transmission; or
DCI used for scheduling uplink reference signal transmission.

Optionally, the downlink information includes the RAR; and the transmitting, by the terminal, a beam failure recovery request message to a network side includes: transmitting, by the terminal, the beam failure recovery request message to the network side by using a contention-based physical random access channel PRACH.

Optionally, the scheduling information, the first trigger information, or the second trigger information is used for cross-carrier scheduling.

Optionally, the transmitting, by the terminal, a beam failure recovery request message to a network side includes:
transmitting, by the terminal, the beam failure recovery request message to the network side by using a PRACH, a MAC CE, or a second PUCCH.

Optionally, the first preset cell is one of the following:
a cell with a beam failure;
a cell without a beam failure;
a cell in the at least one cell;
a cell not in the at least one cell; or
a primary cell.

Optionally, the second preset cell is one of the following:
a cell with a beam failure;
a cell without a beam failure;
a cell in the at least one cell;
a cell not in the at least one cell; or
a primary cell.

Optionally, when the computer program is executed by the processor 91, the following steps can further be implemented:
the transmitting a first PUCCH of at least one cell by using determined spatial relation information includes:
within a first preset period of time, transmitting the first PUCCH of the at least one cell by using the determined spatial relation information.

Optionally, the first preset period of time starts from one of the following:
when the first preset condition is satisfied; or
when second preset duration elapses after the first preset condition is satisfied.

Optionally, the second preset duration is K symbols or K slots.

Optionally, if the first preset condition is that downlink information transmitted by the network side is received in the first preset cell, K is determined in one of the following manners:
if the first PUCCH and the first preset cell are on carriers of different bands, and the first preset cell is on a carrier of FR1, determining is performed based on a subcarrier spacing of a carrier in which the first PUCCH is located;
if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;
if the first PUCCH and the first preset cell are on different carriers of a same band, determining is performed based on the subcarrier spacing of the carrier in which the first PUCCH is located or the subcarrier spacing of the carrier in which the first preset cell is located; or
if the first PUCCH and the first preset cell are on a same carrier, determining is performed based on a subcarrier spacing of the same carrier.

Optionally, if the first preset condition is that the beam failure recovery request message is transmitted to the network side for N times in the second preset cell; or that the beam failure recovery request message is transmitted to the network side for N times in the second preset cell, and downlink information transmitted by the network side has not been received in the first preset cell within the first preset duration.

K is determined in one of the following manners:
if the first PUCCH and the second preset cell are on carriers of different bands, and the second preset cell is on a carrier of FR1, determining is performed based on a subcarrier spacing of a carrier in which the first PUCCH is located;
if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;
if the first PUCCH and the second preset cell are on different carriers of a same band, determining is performed based on the subcarrier spacing of the carrier in which the first PUCCH is located or the subcarrier spacing of the carrier in which the second preset cell is located; or
if the first PUCCH and the second preset cell are on a same carrier, determining is performed based on a subcarrier spacing of the same carrier.

Optionally, the first preset period of time ends when the terminal receives configuration information, reconfiguration information, or an activation command for spatial relation information of the first PUCCH from the network side.

Optionally, the first PUCCH of the at least one cell includes one of the following:
all PUCCHs of the at least one cell;
all PUCCHs of a third preset cell in the at least one cell;
a preset PUCCH of the at least one cell; or
a preset PUCCH of the third preset cell in the at least one cell.

The third preset cell is, for example, a cell with a preset cell index in the at least one cell.

The preset PUCCH is, for example, a PUCCH with a preset PUCCH resource index in the at least one cell or in a third preset cell of the at least one cell.

Optionally, the spatial relation information is determined in one of the following manners:
using spatial relation information of an uplink channel for transmitting a beam failure recovery request message in the at least one cell;

using spatial relation information of a preset channel in a fourth preset cell of the at least one cell;
using QCL information of a preset channel in a fourth preset cell of the at least one cell;
using spatial relation information of a preset reference signal in a fourth preset cell of the at least one cell;
using QCL information of a preset reference signal in a fourth preset cell of the at least one cell;
using spatial relation information of a preset channel in a fifth preset cell;
using QCL information of a preset channel in a fifth preset cell;
using spatial relation information of a preset reference signal in a fifth preset cell;
using QCL information of a preset reference signal in a fifth preset cell;
using spatial relation information of a preset channel in a primary cell;
using QCL information of a preset channel in a primary cell;
using spatial relation information of a preset reference signal in a primary cell; or
using QCL information of a preset reference signal in a primary cell.

Optionally, the uplink channel is a contention-free PRACH only; or
the uplink channel is a contention-free PRACH or a contention-based PRACH; or
the uplink channel is a PUCCH; or
the uplink channel is an uplink channel corresponding to a MAC CE.

Optionally, the fourth preset cell is one of the following:
a cell without a beam failure in the at least one cell; or
a cell with a beam failure in the at least one cell.

Optionally, the fifth preset cell is one of the following:
a cell not in the at least one cell;
a cell without a beam failure in the at least one cell; or
a cell with a beam failure in the at least one cell.

Optionally, the preset channel is one of the following:
a PUCCH;
a PRACH;
a PUSCH;
a PDCCH; or
a PDSCH.

Optionally, the preset reference signal is one of the following:
an SRS;
a CSI-RS;
an SSB;
a TRS; or
a PTRS.

Figure 10:
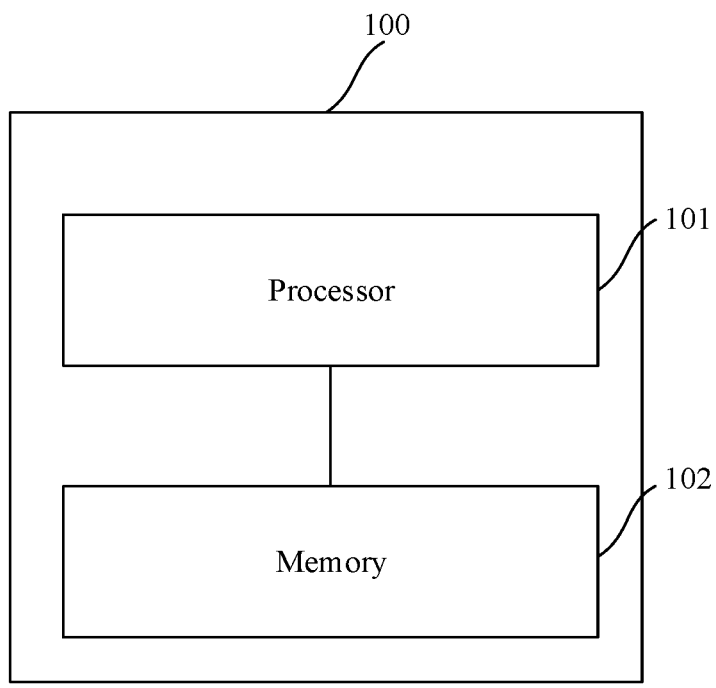
FIG. 10 is a schematic structural diagram of a network-side device according to another embodiment of this disclosure.

Referring to FIG. 10, FIG. 10 is a schematic structural diagram of a network-side device according to another embodiment of this disclosure. The network-side device 100 includes a processor 101 and a memory 102. In this embodiment of this disclosure, the network-side device 100 further includes a computer program stored in the memory 102 and capable of running on the processor 101. When the computer program is executed by the processor 101, the following steps are implemented:
receiving a first PUCCH of at least one cell by using determined spatial relation information after receiving a beam failure recovery request message transmitted by a terminal, where the at least one cell includes: a primary cell and at least one secondary cell, or at least one secondary cell.

The processor 101 is responsible for management of the bus architecture and general processing, and the memory 102 is capable of storing data that is used by the processor 101 during operation.

Optionally, when the computer program is executed by the processor 101, the following steps can further be implemented:
the receiving a first PUCCH of at least one cell by using determined spatial relation information includes:
if a second preset condition is satisfied, receiving the first PUCCH of the at least one cell by using the determined spatial relation information.

Optionally, the second preset condition includes one of the following:
downlink information is transmitted in a first preset cell; or
the beam failure recovery request message is received for N times in a second preset cell, where N is a positive integer greater than or equal to 1.

Optionally, the downlink information includes one of the following:
a PDCCH on a CORESET-BFR;
DCI;
a RAR;
a release command used for releasing a cell in which a beam failure occurs;
scheduling information for a cell with a beam failure;
first trigger information for a cell with a beam failure, where the first trigger information is used to trigger beam measurement and/or beam reporting;
second trigger information for a cell with a beam failure, where the second trigger information is used to trigger SI measurement and/or CSI reporting; or
an ACK or NACK corresponding to scheduling information for a cell with a beam failure.

Optionally, the PDCCH is a PDCCH indicated by a high-layer parameter and corresponding to a DCI format whose CRC is scrambled by a C-RNTI or an MCS-C-RNTI in a search space set of a control resource set for transmitting beam failure recovery request response information.

Optionally, the DCI includes one of the following:
DCI used for indicating the terminal to re-perform beam training;
DCI used for indicating the terminal to re-perform beam selection;
DCI used for scheduling downlink channel transmission;
DCI used for scheduling uplink channel transmission;
DCI used for scheduling downlink reference signal transmission; or
DCI used for scheduling uplink reference signal transmission.

Optionally, the scheduling information, the first trigger information, or the second trigger information is used for cross-carrier scheduling.

Optionally, the first preset cell is one of the following:
a cell with a beam failure;
a cell without a beam failure;
a cell in the at least one cell;
a cell not in the at least one cell; or
a primary cell.

Optionally, the second preset cell is one of the following:
a cell with a beam failure;
a cell without a beam failure;
a cell in the at least one cell;
a cell not in the at least one cell; or
a primary cell.

Optionally, when the computer program is executed by the processor 101, the following steps can further be implemented:

the receiving a first PUCCH of at least one cell by using determined spatial relation information includes:
within a second preset period of time, receiving the first PUCCH of the at least one cell by using the determined spatial relation information.

Optionally, the second preset period of time starts from one of the following:
when the second preset condition is satisfied; or
when third preset duration elapses after the second preset condition is satisfied.

Optionally, the third preset duration is F symbols or F slots.

Optionally, if the second preset condition is that the downlink information is transmitted in the first preset cell, F is determined in one of the following manners:
if the first PUCCH and the first preset cell are on carriers of different bands, and the first preset cell is on a carrier of FR1, determining is performed based on a subcarrier spacing of a carrier in which the first PUCCH is located;
if the first PUCCH and the first preset cell are on carriers of different bands, and the first preset cell is on a carrier of FR2, determining is performed based on the subcarrier spacing of the carrier in which the first PUCCH is located or a subcarrier spacing of a carrier in which the first preset cell is located;
if the first PUCCH and the first preset cell are on different carriers of a same band, determining is performed based on the subcarrier spacing of the carrier in which the first PUCCH is located or the subcarrier spacing of the carrier in which the first preset cell is located; or
if the first PUCCH and the first preset cell are on a same carrier, determining is performed based on a subcarrier spacing of the same carrier.

Optionally, if the second preset condition is that the beam failure recovery request message is received for N times in the second preset cell, F is determined in one of the following manners:
if the first PUCCH and the second preset cell are on carriers of different bands, and the second preset cell is on a carrier of FR1, determining is performed based on a subcarrier spacing of a carrier in which the first PUCCH is located;
if the first PUCCH and the second preset cell are on carriers of different bands, and the second preset cell is on a carrier of FR2, determining is performed based on the subcarrier spacing of the carrier in which the first PUCCH is located or a subcarrier spacing of a carrier in which the second preset cell is located;
if the first PUCCH and the second preset cell are on different carriers of a same band, determining is performed based on the subcarrier spacing of the carrier in which the first PUCCH is located or the subcarrier spacing of the carrier in which the second preset cell is located; or
if the first PUCCH and the second preset cell are on a same carrier, determining is performed based on a subcarrier spacing of the same carrier.

Optionally, the first PUCCH of the at least one cell includes one of the following:
all PUCCHs of the at least one cell;
all PUCCHs of a third preset cell in the at least one cell;
a preset PUCCH of the at least one cell; or
a preset PUCCH of the third preset cell in the at least one cell.

The third preset cell is, for example, a cell with a preset cell index in the at least one cell.

The preset PUCCH is, for example, a PUCCH with a preset PUCCH resource index in the at least one cell or in a third preset cell of the at least one cell.

Optionally, the spatial relation information is determined in one of the following manners:
using spatial relation information of an uplink channel for receiving a beam failure recovery request message in the at least one cell;
using spatial relation information of a preset channel in a fourth preset cell of the at least one cell;
using QCL information of a preset channel in a fourth preset cell of the at least one cell;
using spatial relation information of a preset reference signal in a fourth preset cell of the at least one cell;
using QCL information of a preset reference signal in a fourth preset cell of the at least one cell;
using spatial relation information of a preset channel in a fifth preset cell;
using QCL information of a preset channel in a fifth preset cell;
using spatial relation information of a preset reference signal in a fifth preset cell;
using QCL information of a preset reference signal in a fifth preset cell;
using spatial relation information of a preset channel in a primary cell;
using QCL information of a preset channel in a primary cell;
using spatial relation information of a preset reference signal in a primary cell; or
using QCL information of a preset reference signal in a primary cell.

Optionally, the uplink channel is a contention-free PRACH only; or
the uplink channel is a contention-free PRACH or a contention-based PRACH; or
the uplink channel is a PUCCH; or
the uplink channel is an uplink channel corresponding to a MAC CE.

Optionally, the fourth preset cell is one of the following:
a cell without a beam failure in the at least one cell; or
a cell with a beam failure in the at least one cell.

Optionally, the fifth preset cell is one of the following:
a cell not in the at least one cell;
a cell without a beam failure in the at least one cell; or
a cell with a beam failure in the at least one cell.

Optionally, the preset channel is one of the following:
a PUCCH;
a PRACH;
a PUSCH;
a PDCCH; or
a PDSCH.

Optionally, the preset reference signal is one of the following:
an SRS;
a CSI-RS;
an SSB;
a TRS; or
a PTRS.

An embodiment of this disclosure further provides a computer-readable storage medium. The computer-readable storage medium stores a computer program, and when the computer program is executed by a processor, the processes of the embodiment of the method for PUCCH transmission are implemented, with the same technical effect achieved. To avoid repetition, details are not described herein again.

An embodiment of this disclosure further provides a computer-readable storage medium. The computer-readable storage medium stores a computer program, and when the computer program is executed by a processor, the processes of the embodiment of the method for PUCCH reception are implemented, with the same technical effect achieved. To avoid repetition, details are not described herein again.

The computer-readable storage medium is, for example, a read-only memory (ROM), a random access memory (RAM), a magnetic disk, or an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this disclosure essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementation manners. The foregoing specific implementation manners are merely illustrative rather than restrictive. As instructed by this disclosure, persons of ordinary skill in the art may develop many other manners without departing from principles of this disclosure and the protection scope of the claims, and all such manners fall within the protection scope of this disclosure.

What is claimed is:

1. A method for physical uplink control channel (PUCCH) transmission, applied to a terminal and comprising:
within a first preset period of time, transmitting a first PUCCH of at least one of a plurality of cells by using determined spatial relation information after transmitting a beam failure recovery request message to a network side, wherein the plurality of cells comprises: a primary cell and a plurality of secondary cells; wherein the primary cell is a Primary cell (PCell) of a master cell group (MCG) or a Primary secondary cell (PSCell) of a secondary cell group (SCG); wherein each secondary cell is a secondary cell (Scell) other than the PSCell;
wherein the transmitting, by the terminal, the beam failure recovery request message to the network side comprises:
transmitting, by the terminal, the beam failure recovery request message to the network side by using a media access control control element (MAC CE);
wherein the determined spatial relation information is derived based on a preset reference signal in a first preset cell; wherein the preset reference signal is a channel state information reference signal CSI-RS or a synchronization signal block SSB, and the first preset cell is a secondary cell with a beam failure in the plurality of cells;
wherein the first preset period of time starts from: when first preset duration elapses after a first preset condition is satisfied, and the first preset duration is K symbols;
wherein the first preset condition comprises downlink control information DCI transmitted by the network side is received in a second preset cell in the plurality of cells.

2. The method according to claim 1, wherein the first preset condition comprises one of the following:
downlink information transmitted by the network side is received in the second preset cell;
the beam failure recovery request message is transmitted to the network side for N times in the second preset cell;
the beam failure recovery request message is transmitted to the network side for N times in the second preset cell, and downlink information transmitted by the network side has not been received in the second preset cell within second preset duration; wherein N is an integer greater than or equal to 1;
the beam failure recovery request message is transmitted to the network side for N times in a third preset cell different from the second preset cell; or
the beam failure recovery request message is transmitted to the network side for N times in a third preset cell different from the second preset cell, and downlink information transmitted by the network side has not been received in the second preset cell within second preset duration; wherein N is an integer greater than or equal to 1;
wherein the downlink information comprises one of the following:
a physical downlink control channel (PDCCH) on a control resource set for beam failure recovery (CORESET-BFR);
a random access response (RAR);
a release command used for releasing a cell in which a beam failure occurs;
scheduling information for a cell with a beam failure;
first trigger information for a cell with a beam failure, wherein the first trigger information is used to trigger beam measurement and/or beam reporting;
second trigger information for a cell with a beam failure, wherein the second trigger information is used to trigger channel state information (CSI) measurement and/or CSI reporting;
an acknowledgement (ACK) corresponding to scheduling information for a cell with a beam failure; or
a negative acknowledgement (NACK) corresponding to scheduling information for a cell with a beam failure.

3. The method according to claim 2, wherein the second preset cell is one of the following:
a cell with a beam failure;
a cell without a beam failure;
a cell in the plurality of cells;
a cell not in the plurality of cells; or
the primary cell.

4. The method according to claim 1, wherein the DCI comprises one of the following:
   DCI used for indicating the terminal to re-perform beam training;
   DCI used for indicating the terminal to re-perform beam selection;
   DCI used for scheduling downlink channel transmission;
   DCI used for scheduling uplink channel transmission;
   DCI used for scheduling downlink reference signal transmission; or
   DCI used for scheduling uplink reference signal transmission.

5. The method according to claim 1, wherein K is determined in one of the following manners:
   in a case that the first PUCCH and the second preset cell are on carriers of different bands, and the second preset cell is on a carrier of Frequency Range 1 (FR1), determining is performed based on a subcarrier spacing of a carrier in which the first PUCCH is located;
   in a case that the first PUCCH and the second preset cell are on carriers of different bands, and the second preset cell is on a carrier of Frequency Range 2 (FR2), determining is performed based on the subcarrier spacing of the carrier in which the first PUCCH is located or a subcarrier spacing of a carrier in which the second preset cell is located;
   in a case that the first PUCCH and the second preset cell are on different carriers of a same band, determining is performed based on the subcarrier spacing of the carrier in which the first PUCCH is located or the subcarrier spacing of the carrier in which the second preset cell is located; or
   in a case that the first PUCCH and the second preset cell are on a same carrier, determining is performed based on a subcarrier spacing of the same carrier.

6. The method according to claim 1, wherein the first preset period of time ends when the terminal receives configuration information, reconfiguration information, or an activation command for the spatial relation information of the first PUCCH from the network side.

7. The method according to claim 1, wherein the spatial relation information is further determined in one of the following manners:
   using spatial relation information of an uplink channel for transmitting a beam failure recovery request message in the plurality of cells;
   using spatial relation information of a preset channel in a third preset cell of the plurality of cells;
   using QCL information of a preset channel in a third preset cell of the plurality of cells;
   using spatial relation information of a preset reference signal in a third second preset cell of the plurality of cells;
   using QCL information of a preset reference signal in a third preset cell of the plurality of cells;
   using spatial relation information of a preset channel in a fourth preset cell;
   using spatial relation information of a preset reference signal in a fourth preset cell;
   using QCL information of a preset reference signal in a fourth preset cell;
   using spatial relation information of a preset channel in the primary cell;
   using QCL information of a preset channel in the primary cell;
   using spatial relation information of a preset reference signal in the primary cell; or
   using QCL information of a preset reference signal in the primary cell.

8. A terminal, comprising a processor, a memory, and a computer program stored in the memory and capable of running on the processor, wherein the computer program is executed by the processor to implement:
   within a first preset period of time, transmitting a first PUCCH of at least one of a plurality of cells by using determined spatial relation information after transmitting a beam failure recovery request message to a network side, wherein the plurality of cells comprises: a primary cell and a plurality of secondary cells; wherein the primary cell is a Primary cell (PCell) of a master cell group (MCG) or a Primary secondary cell (PSCell) of a secondary cell group (SCG); wherein each secondary cell is a secondary cell (Scell) other than the PSCell;
   wherein the computer program is further executed by a processor to implement:
   transmitting the beam failure recovery request message to the network side by using a media access control control element (MAC CE);
   wherein the determined spatial relation information is derived based on a preset reference signal in a first preset cell; wherein the preset reference signal is a channel state information reference signal CSI-RS or a synchronization signal block SSB, and the first preset cell is a secondary cell with a beam failure in the plurality of cells;
   wherein the first preset period of time starts from: when first preset duration elapses after a first preset condition is satisfied, and the first preset duration is K symbols;
   wherein the first preset condition comprises downlink control information DCI transmitted by the network side is received in a second preset cell in the plurality of cells.

9. The terminal according to claim 8, wherein the first preset condition comprises one of the following:
   downlink information transmitted by the network side is received in the second preset cell;
   the beam failure recovery request message is transmitted to the network side for N times in the second preset cell;
   the beam failure recovery request message is transmitted to the network side for N times in the second preset cell, and downlink information transmitted by the network side has not been received in the second preset cell within second preset duration; wherein N is an integer greater than or equal to 1;
   the beam failure recovery request message is transmitted to the network side for N times in a third preset cell different from the second preset cell; or
   the beam failure recovery request message is transmitted to the network side for N times in a third preset cell different from the second preset cell, and downlink information transmitted by the network side has not been received in the second preset cell within second preset duration; wherein
   N is an integer greater than or equal to 1;
   wherein the downlink information comprises one of the following:
   a physical downlink control channel (PDCCH) on a control resource set for beam failure recovery (CORE-SET-BFR);
   a random access response (RAR);
   a release command used for releasing a cell in which a beam failure occurs;

scheduling information for a cell with a beam failure;
first trigger information for a cell with a beam failure, wherein the first trigger information is used to trigger beam measurement and/or beam reporting;
second trigger information for a cell with a beam failure, wherein the second trigger information is used to trigger channel state information (CSI) measurement and/or CSI reporting;
an acknowledgement (ACK) corresponding to scheduling information for a cell with a beam failure; or
a negative acknowledgement (NACK) corresponding to scheduling information for a cell with a beam failure.

10. The terminal according to claim 9, wherein the second preset cell is one of the following:
a cell with a beam failure;
a cell without a beam failure;
a cell in the at least one cell;
a cell not in the at least one cell; or
the primary cell.

11. The terminal according to claim 8, wherein the DCI comprises one of the following:
DCI used for indicating the terminal to re-perform beam training;
DCI used for indicating the terminal to re-perform beam selection;
DCI used for scheduling downlink channel transmission;
DCI used for scheduling uplink channel transmission;
DCI used for scheduling downlink reference signal transmission; or
DCI used for scheduling uplink reference signal transmission.

12. The terminal according to claim 8, wherein K is determined in one of the following manners:
in a case that the first PUCCH and the second preset cell are on carriers of different bands, and the second preset cell is on a carrier of Frequency Range 1 (FR1), determining is performed based on a subcarrier spacing of a carrier in which the first PUCCH is located;
in a case that the first PUCCH and the second preset cell are on carriers of different bands, and the second preset cell is on a carrier of Frequency Range 2 (FR2), determining is performed based on the subcarrier spacing of the carrier in which the first PUCCH is located or a subcarrier spacing of a carrier in which the second preset cell is located;
in a case that the first PUCCH and the second preset cell are on different carriers of a same band, determining is performed based on the subcarrier spacing of the carrier in which the first PUCCH is located or the subcarrier spacing of the carrier in which the second preset cell is located; or
in a case that the first PUCCH and the second preset cell are on a same carrier, determining is performed based on a subcarrier spacing of the same carrier.

13. The terminal according to claim 8, wherein the first preset period of time ends when the terminal receives configuration information, reconfiguration information, or an activation command for the spatial relation information of the first PUCCH from the network side.

* * * * *